United States Patent [19]

Piatt

[11] Patent Number: 5,672,847

[45] Date of Patent: Sep. 30, 1997

[54] COMPUTER CABLE BENDER

[76] Inventor: John Allen Piatt, 226 Getchell St., Santa Cruz, Calif. 95060

[21] Appl. No.: 555,913

[22] Filed: Nov. 13, 1995

[51] Int. Cl.[6] .................................................. F16L 3/10
[52] U.S. Cl. .......................... 174/135; 174/156; 174/155; 248/74.4
[58] Field of Search .................. 174/135, 69, 138 G, 174/155, 156, 154, 136; D8/356; 248/74.4, 488

[56] References Cited

U.S. PATENT DOCUMENTS

| | | | |
|---|---|---|---|
| 814,101 | 3/1906 | Weel | 248/474 |
| 971,619 | 10/1910 | Klugh | 174/155 |
| 1,785,518 | 12/1930 | Higgins | 267/174 |
| 2,015,403 | 8/1935 | Kiddle | 24/135 R |

OTHER PUBLICATIONS

"How Macs Work", John Rizzo and K. Daniel Clark, Ziff-Davis Press Copyright 1993, pp. 126–127.

*Primary Examiner*—Kristine L. Kincaid
*Assistant Examiner*—Kamand Cuneo
*Attorney, Agent, or Firm*—Thomas E. Schatzel; Law Offices of Thomas E. Schatzel A Prof. Corporation

[57] ABSTRACT

A computer cable bender which has two haves that are coupled together. The halves are supported by a base and have arcuate channels of circular cross section to surround the cable. The cable is redirected from a vertical orientation to a horizontal orientation thereby providing strain relief to the cable.

11 Claims, 7 Drawing Sheets

COMPUTER CABLE BENDER

BACKGROUND OF THE INVENTION

1. Field of the Invention

This invention relates generally to strain relief for cables of computer input devices, and more particularly to the cable connecting an accessory device to a computer system.

2. Description of the Prior Art

Figure 1:
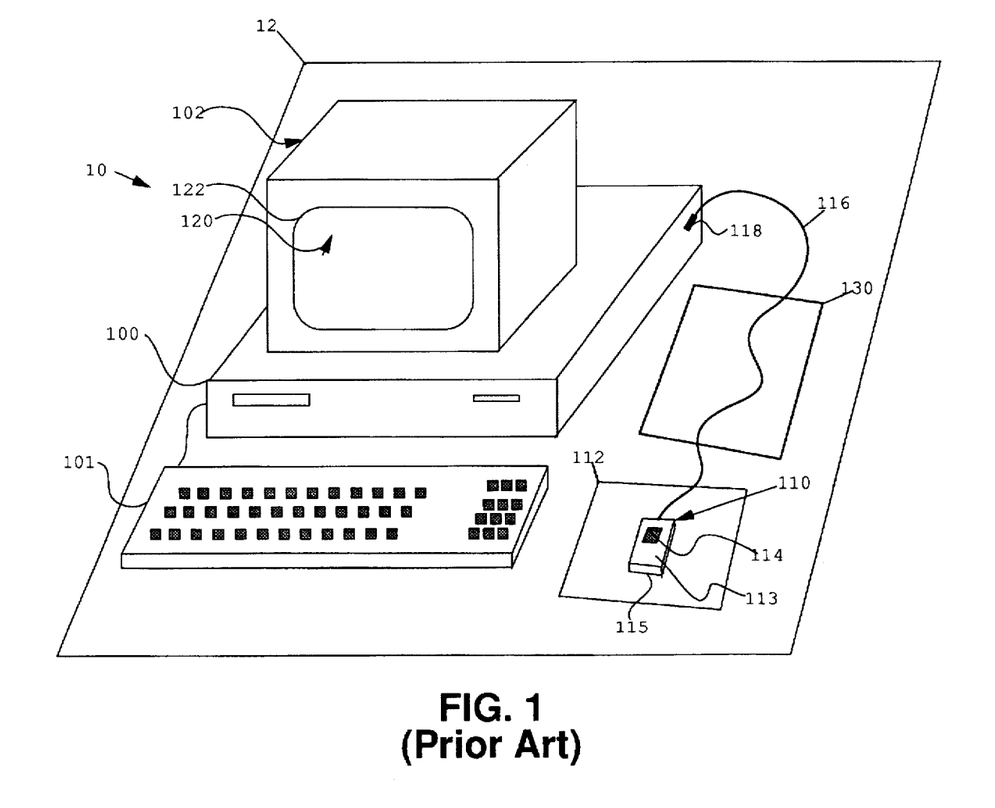
FIG. 1 illustrates a diagram of a prior art computer system using a computer mouse.

In early computer systems, a user input information into a computer through the use of a keyboard. When a graphical user interface (GUI) was introduced, a mouse was utilized to allow a user to input additional information and further control a computer. FIG. 1 illustrates a typical computer system 10 resting on a desktop or some other surface 12. The typical computer system 10 includes a computer central processing unit (CPU) 100, keyboard 101, monitor 102, computer mouse 110, and a mouse pad 112. The typical computer mouse 110 includes a mouse body 113, a mouse button or buttons 114, a mouse base 115, a mouse cable 116 and a connector 118. The mouse body 113 may include electronic and mechanical components for determining selection of mouse buttons, and changes in position including directional information and velocity. In some cases the base 115 of the mouse 110 includes a rollerball and may additionally include teflon pads. In other cases, such as in an optical mouse, the base of the mouse includes felt pads and light passages or openings for an LED transmitter and an LED receiver. In either case, the typical mouse communicates position information such that a mouse pointer 120 may be moved around on a display screen 122 of the monitor 102 and the mouse buttons 114 can execute computer commands or other functions. Usually the mouse body 113 is placed on a slightly elevated surface such as the mouse pad 112 above the surface 12 in order to improve mouse movement but may be directly placed on the surface 12. The typical mouse pad 112 may be approximately nine inches by ten inches with a thickness of one-quarter inch. In the case of an optical mouse, the mouse pad 112 provides a reflective grid such that the optical mouse can provide position information. The mouse cable 116 typically includes multiple wire conductors for communicating with the computer system 10 and providing power. The mouse cable 116 in some cases is plugged into the CPU 100 as illustrated by FIG. 1 while in other cases it may be plugged into the keyboard 101 which is connected to the CPU 100. In either case the mouse cable 116 of the mouse transmits and receives signals between the mouse 110 and the CPU 100 and may additionally provide power and ground to other electrical components within the mouse. The mouse cable 116 connecting the mouse 110 with the CPU 100 or keyboard 101 may also be referred to as a mouse tail.

In order for the computer mouse 110 to provide the position information to the computer system 10 it must be able to freely move about over an area approximately the size of the mouse pad 112. Because many computer systems are placed on desktops or other surfaces 12, a user may place papers, books or other objects 130 on top of the mouse cable 116 which generally rests flat on the surface 12. The papers, books or other objects 130 on top of the mouse cable 116 resting on the surface 12 can limit the movement of the mouse body 113 which thereby limits the amount of mouse pointer movement on a computer screen. A user may try to increase the movement in the mouse body 113 by pulling on the mouse to free the mouse cable 116. This may place a strain on the mouse cable and possibly detach the mouse cable 116 from the mouse body 113 destroying the connection between the mouse 110 and the computer system 10. It is desirable to provide slack in the mouse cable in order that the mouse body can move freely over a wide area. It is desirable to provide slack in the mouse cable in order that a user does not pull the mouse cable out of the mouse body. It is desirable to direct and support the mouse cable into the air such that any objects placed on the mouse cable will be placed a distance away from the mouse body.

SUMMARY OF THE INVENTION

It is an object of the present invention to provide slack in the cable connecting a computer mouse to a computer system.

Another object of the present invention is to vertically bend the cable connecting a computer mouse to a computer system.

A still further object of the present invention is to prevent a user from damaging the connection between a computer mouse cable and a computer mouse body.

A first embodiment of the present invention bends a portion of the mouse cable around a spool. The cable is held in place around the spool by strapping the bend of the cable with an elastic o-ring or band. A second embodiment of the present invention sandwiches the mouse cable between a bent channel within two cable bender halves. The angle of the bent channel causes the mouse cable to be bent from a horizontal direction towards a vertical direction. Each of the two cable bender halves have a key and keyhole to mate with each other to hold the halves together. A cable bender base is further provided to hold the two cable bender halves together and vertically support the halves on a surface. One or more advertising circles may be included on or within the cable bender halves. Alternatively the cable bender and base may be made of a one piece injection molded body having an open channel such that a cable may be inserted therein. The cable bender body may also be shaped to include a small storage area such as a box or cylindrical jar for holding office supplies such as a pencil sharpener, white out dispenser, letter opener, paper clips, or personal items such as coins or cosmetics.

An advantage of the present invention is that a cable connecting a mouse with a computer system may be bent thereby providing slack in the cable in order to maintain the potential range of mouse movement.

Another advantage of the present invention is that a cable connecting a mouse with a computer system may be vertically bent thereby keeping papers, books and other objects from covering a portion of the mouse cable.

A further advantage of the present invention is that slack is provided within a cable connecting a mouse with a computer system thereby reducing potential damage to the computer mouse and its cable.

These and other objects and advantages of the present invention will no doubt become obvious to those of ordinary skill in the art after having read the following detailed description of the preferred embodiments which are illustrated in the various drawing figures.

DETAILED DESCRIPTION OF THE PREFERRED EMBODIMENT

The present invention provides a structure for directing and supporting a cable such as the mouse tail or mouse cable 116 above the surface 12 and generating slack therein such that the mouse body 113 may have greater movement around the mouse pad 112 when objects 130 lay atop the mouse cable 116. Vertical bends are generated in the mouse cable 116 thereby supporting a portion of the mouse cable 116 above the surface 12.

Figure 2:
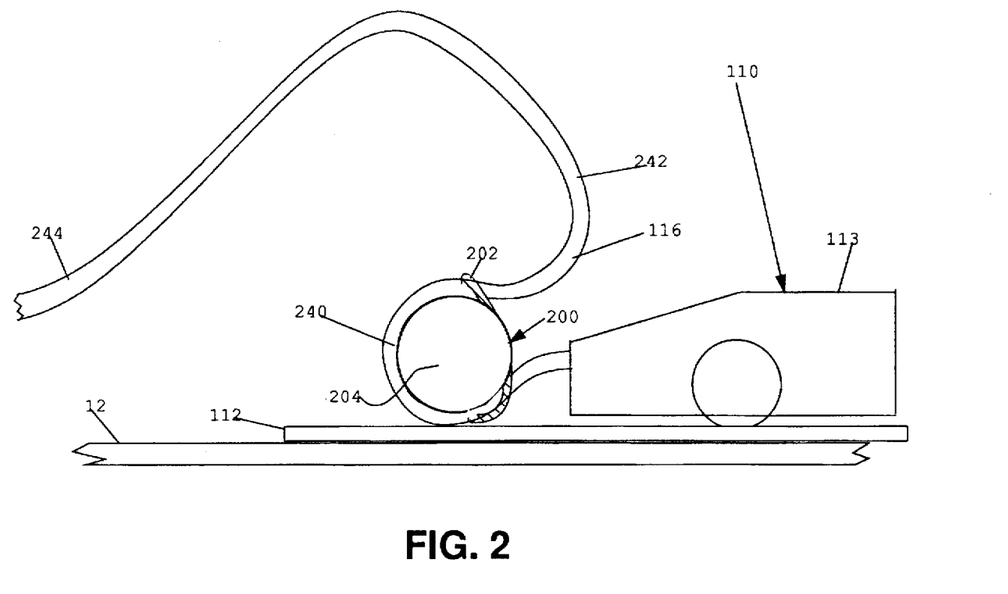
FIG. 2 illustrates an assembled side view of a first embodiment of the present invention.

FIG. 2 illustrates a first embodiment of the cable bender of the present invention and is referred to by the general reference designator 200. The cable bender 200 includes an elastic o-ring or band 202 and a spool 204. The cable bender 200 vertically bends the mouse tail or mouse cable 116 of the mouse 110 into space above the surface 12. The cable bender 200 generates a backward bend 240 above the surface 12 which in turn further generates a bend 242 and a bend 244 in the mouse cable 116. Preferably the cable bender 200 is positioned near the mouse body 113.

Figure 3:
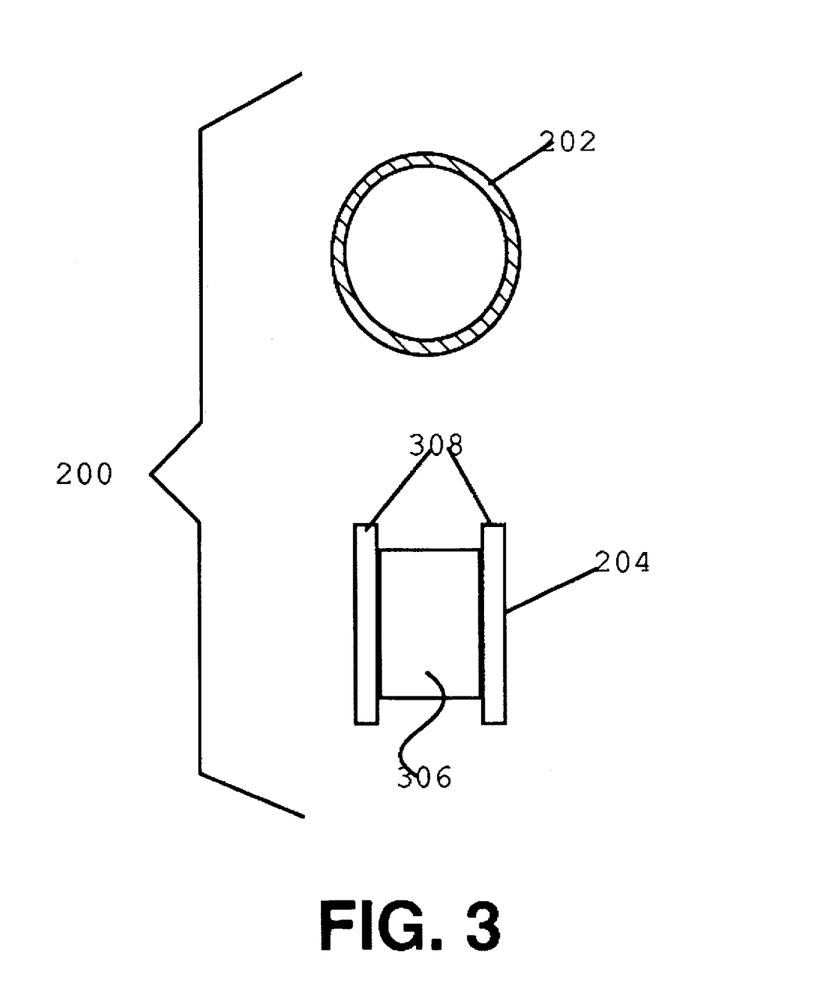
FIG. 3 illustrates a disassembled view of the components of the FIG. 2.

FIG. 3 further illustrates disassembled components of the cable bender 200 including the elastic o-ring or band 202 and the spool 204. The elastic o-ring or band 202 may be made of a rubber material or some other elastic material. The outer diameter of the elastic o-ring or band 202 may be approximately seven-eights of an inch while the inner diameter may be six-eights of an inch. The spool 204 is preferably made of plastic but may be made of wood or some other material. Spool 204 is cylindrical in shape and includes a hollow or solid cylindrical center 306 and cylindrical sides 308. The diameter of the cylindrical sides 308 may be approximately seven-eights of an inch. The outer diameter of the hollow or solid cylindrical center 306 may be approximately six-eights of an inch. The height of the cylindrical sides 308 may be approximately three-thirty-seconds of an inch while the cylindrical center 306 may be approximately one-quarter of an inch in height. The spool 204 may assume other shapes such as triangular, rectangular, pentagonal, or hexagonal.

Figure 4:
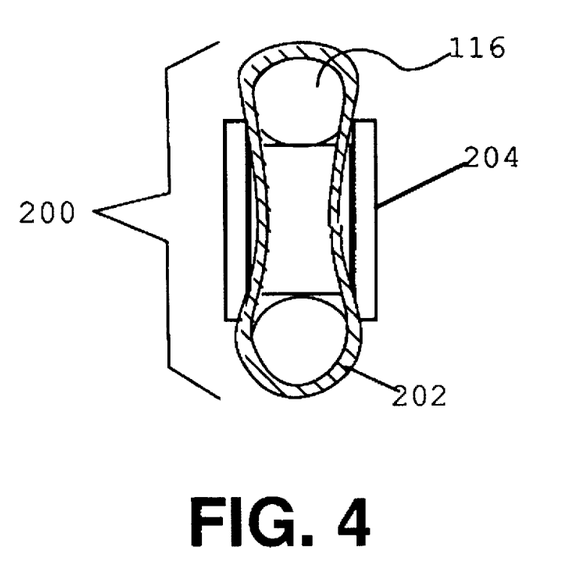
FIG. 4 illustrates an assembled front cross sectional view of FIG. 2.

Referring to FIGS. 2, 3 and 4, the cable bender 200 may be assembled around the mouse cable 116 of the mouse 110 in the following manner. The spool 204 is vertically placed on top of a portion of the mouse cable 116. A portion of the mouse cable 116 is partially wrapped backward around the spool 204 thereby generating the backward vertical bend 240 in the mouse cable. The elastic o-ring or band 202 is elongated such that it may be inserted over the bend 240 and the spool 204 towards the mouse body 113. The elastic o-ring or band 202 having a narrow center portion is positioned against the cylindrical center 306 of the spool 204 between the cylindrical sides 308 as illustrated by FIG. 4. As such, the o-ring or band 202 holds a portion of the cable 116 wrapped around the center of the spool 204. Referring to FIG. 2, the vertical bend 240 in the mouse cable 116 further generates a forward vertical bend 242 and a forward vertical bend 244. The forward vertical bend 242 and the elasticity of the o-ring or band 202 provide slack in the mouse cable 116 such that the mouse body 113 may have greater motion when other portions of the mouse cable 116 are fixed against the surface 12 by papers, books, or other objects 130. Furthermore the height of the forward vertical bend 242 being on the order of approximately four and one-half inches above the surface 12, keeps a user from placing papers, books or other objects 130 near the mouse 110 and substantially reducing its movement. The slack provided by the cable bender 200 reduces the possibility that a user will pull on the mouse body in order to acquire greater movement in the mouse and disconnect the mouse cable 116 from the mouse body 113.

Figure 5:
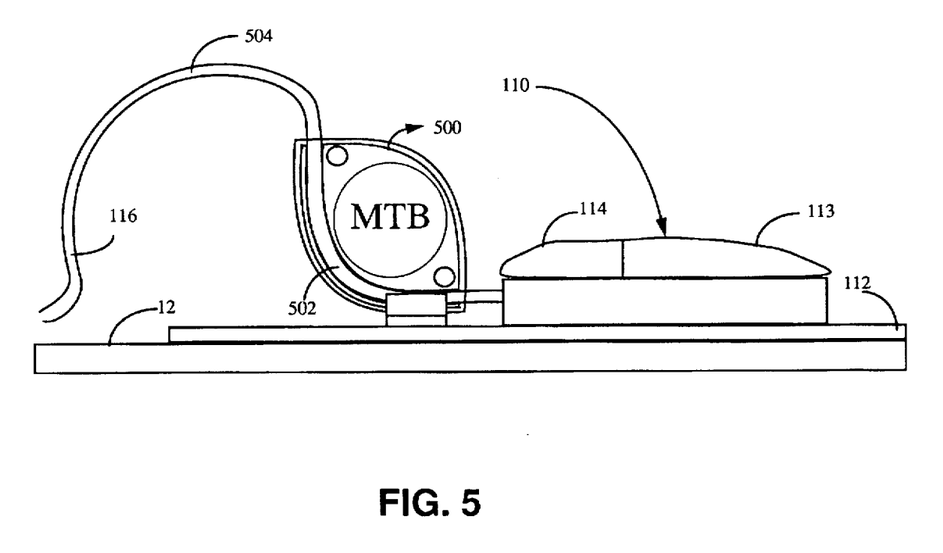
FIG. 5 illustrates an assembled side view of a second embodiment of the present invention.

FIG. 5 illustrates a second embodiment of the present invention, the cable bender, and is referred to by the general reference designator 500. The cable bender 500 vertically bends the mouse cable 116 of the mouse 110 generating a bend 502 causing a portion of the mouse cable 116 to rise and be supported above the surface 12. The bend 502 causes other bends such as a bend 504 to be generated as the mouse cable 116 descends back down to the surface 12. The cable bender 500 may be made of one piece such as a plastic injection molded body having an open channel such that a cable may be inserted therein. Alternatively the cable bender 500 may be made of components such that it may sandwich the mouse cable 116. Components of the cable bender 500 may be made of a plastic material, metallic material or some other solid material such as wood. A major part of the cable bender 500 illustrated in FIG. 5 appears to be somewhat shaped as a symmetric leaf. Alternatively the cable bender may also be shaped to include a small storage area such as a box or cylindrical jar for holding office supplies such as a pencil sharpener, white out dispenser, letter opener, paper clips, or personal items such as coins or cosmetics. The cable bender 500 may also be designed to support small lightweight objects such as a toy football, a toy football helmet, a toy baseball, a toy baseball cap, a toy basketball, a small globe, or a variety of small fury stuffed animals.

Figure 6:
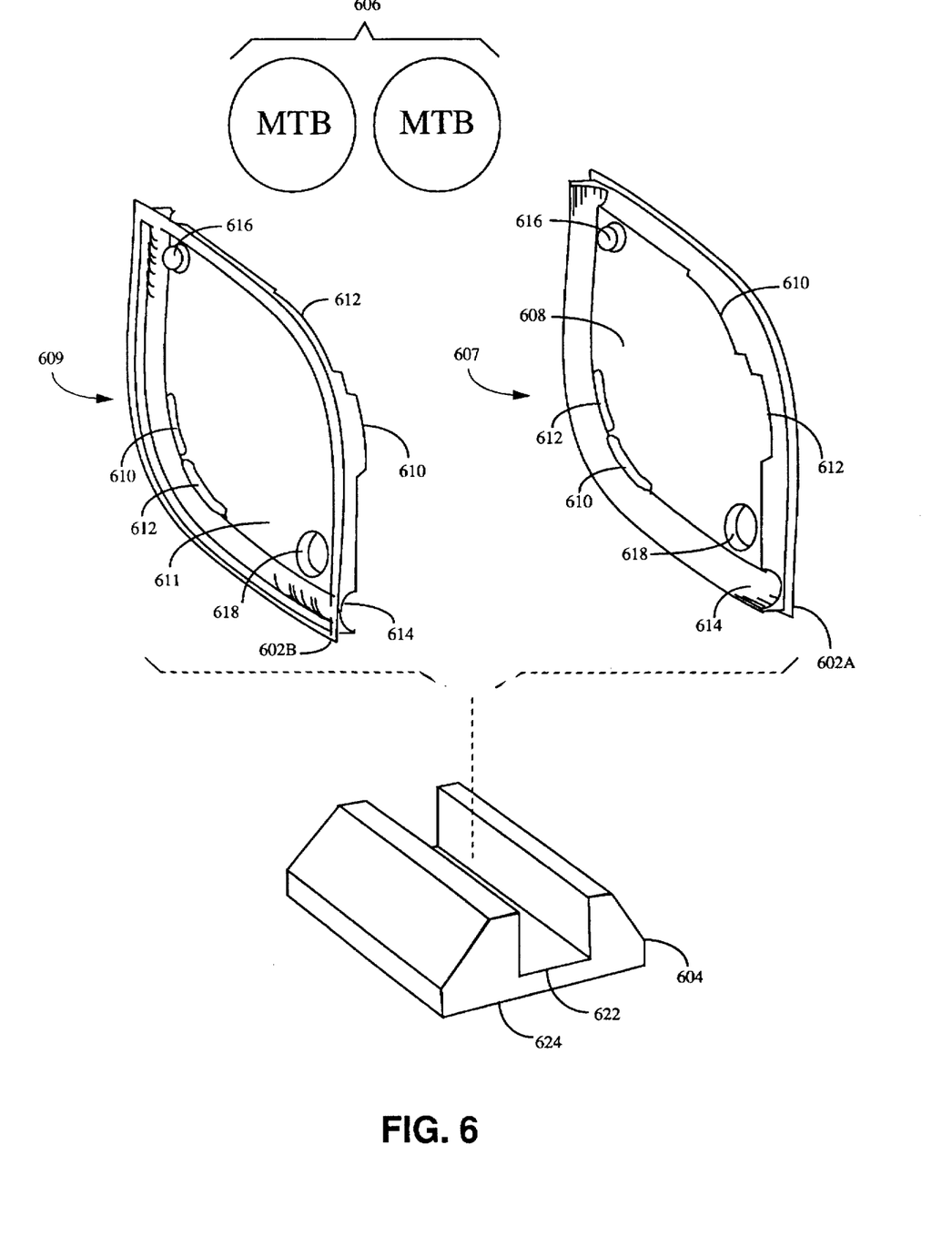
FIG. 6 illustrates a disassembled view of the components of FIG. 5.

FIG. 6 illustrates the disassembled components of the cable bender 500. The cable bender 500 includes a pair of similar cable bender halves 602 (illustrated as 602A and 602B for convenience of explanation) and a cable bender base 604. The two cable bender halves 602, when assembled and interlocked, form a spool-like surface for wrapping a portion of the cable 116. The cable bender 500 may also include one or two thin display or advertising circles 606 for aesthetic or marketing purposes.

Each cable bender half 602 is shaped similar to a symmetric leaf and may be made of plastic. The symmetric shape of each cable bender half 602 provides that one mold may be used in its manufacture. When viewed from an inner-surface 607, each cable bender half 602 includes a flat symmetric leaf shaped innersurface 608 such that one or two thin display or advertising circles 606 may be vertically supported. To hold the thin display or advertising circles 606 in place on the surface 608, each cable bender half 602 has a pair of arc shaped ridges 610 on the surface 608 and located on opposite sides of an imaginary circle. When viewed from an outer-surface 609, each cable bender half includes a flat symmetric leaf shaped outer-surface 611 such that one or two thin display or advertising circles 606 may be vertically supported. To hold the thin display or advertising circles 606 in place on the surface 611 of a cable bender half 602, each cable bender half 602 includes a pair of arc shaped ridges 612 in the surface 611 located on opposite sides of an imaginary circle. The arc shaped ridges 612 on the surface 611 form arc shaped depressions on the surface 608 while the arc shaped ridges 610 formed on the surface 608 form arc shaped depressions on the surface 611. The dimensions of arc shaped ridges are approximately three-eights inch in circumference around a circle having a diameter of one and one-sixteenth inches. The dimensions of the arc shaped depressions are approximately three-eights inch in circumference around a circle having a diameter of one and one-sixteenth inches.

Each cable bender half 602 includes a bent channel 614 for sandwiching the mouse cable 116. Preferably the cross section of the bent channel 614 is semicircular in shape in order to receive a circular cable but may assume other shapes. The bent channel 614 in each cable bender half 602 may have a radius or depth such that a cable 116 having a diameter of approximately five-sixty-fourths of an inch diameter may be inserted therein. The angle of bend generated by the bent channel 614 is preferably approximately ninety degrees thereby bending the direction of the mouse cable 116 from a plane horizontal to the surface 12 to a plane vertical to the surface 12. Other angles of bend may be used in order to bend the mouse cable 116 from one plane of direction to another plane of direction.

As illustrated in FIG. 6, one of the cable bender halves 602 is oriented as the cable bender half 602A such that when viewed from the point of view of the inner-surface 607, the bent channel 614 may start at the top edge near the upper left hand corner bending from the front edge to the bottom edge and terminating into the back edge near the lower right hand corner of the cable bender half 602A. The cable bender half 602B when viewed from the inner-surface 607 is oriented with the bent channel 614 starting at the top edge near the upper right hand corner bending from the front edge to the bottom edge and terminating into the back edge hear the lower left hand corner.

When viewed from the inner-surface 607, the cable bender half 62A may be further oriented such that a key 616 is near the upper left hand corner and the top edge just to the right of the bent channel 614 while a keyhole 618 is near the lower right hand corner and the back edge just above the bent channel 614. When viewed from the inner-surface 607, the cable bender half 602B may be further oriented such that the keyhole 618 is near the upper right hand corner and the top edge just to the left of the bent channel 614 while the key 616 is near the lower left hand corner and the back edge just above the bent channel 614. Preferably the key 616 and keyhole 618 are cylindrically shaped and hollow respectively having a cap on top of the cylinder for the key and a closing on bottom of the cylinder for the keyhole. Thus, the approximate dimensions of the cylinder for the key 616 in each cable bender half 602 is approximately one-eight inch in diameter and rises approximately one-sixteenth of an inch from the surface 608 and is capped at the top of the cylinder. The cylinder for the keyhole 618 in each cable bender half 602 is approximately one-eight inch in diameter and drops approximately one-sixteenth of an inch from the surface 608 and is closed at the base of the cylinder.

The approximate outer dimensions of each cable bender half 602 is one and one-half inch high and one and one-half inch wide. The thickness of two assembled cable bender halves 602 is approximately seven-thirty-seconds of an inch around its edge. Preferably each cable bender half 602 is made of a clear material such as a clear plastic so that if the cable bender 500 includes the flat display or advertising circle 606 it may be visible from each side of the cable bender 500. The cable bender half 602 may include a recessed area for inserting and removing the flat display or advertising circle 606 between two assembled cable bender halves 602 without having to disassemble the cable bender 500. In the case that the cable bender 500 is made of one piece such as a one piece injection molded plastic, the cable bender 500 may include a slit or small opening at top and a thin cavity for inserting and removing the flat display or advertising circle 606.

The flat display or advertising circles 606 may be approximately one inch in diameter and are generally paper thin. The flat display or advertising circles 606 may be spot glued in place to the surface 608 of either cable bender half 602 or to one or both surfaces 611 of each cable bender half 602 in order to properly orient and display each message or image. The flat display or advertising circles 606 may include a small tab or grip means to allow insertion and removal between the cable bender halves 602 without disassembly. The small tab or grip means may also allow for insertion into and removal from the thin cavity by means of the slit or small opening within the one piece cable bender 500.

The cable bender base 604 is preferably made of a black plastic material and has an open slit 622 at its top having a width such that when the inner-surfaces 608 of two cable bender halves 602 are coupled inner-surface to inner-surface they may be inserted within the slit 622. The width of the slit 622 is approximately less than seven-thirty-seconds of an inch such that the edges of the assembled cable bender halves 602 may be squeezed tight. The depth of the slit 622 is approximately seven-thirty-seconds of an inch. The outer dimensions of the cable bender base 604 are approximately one half inch deep, five-sixteenths of an inch high, twenty-three-thirty-seconds of an inch wide at bottom tapering down to thirteen-thirty-seconds of an inch wide at top. Inserting the coupled cable bender halves 602 into the slit 622 of the mouse cable tender base 604 further holds the two cable bender halves 602 together. The bottom 624 of the cable bender base 604 is preferably flat such that it may rest on the surface 12.

Figure 7:
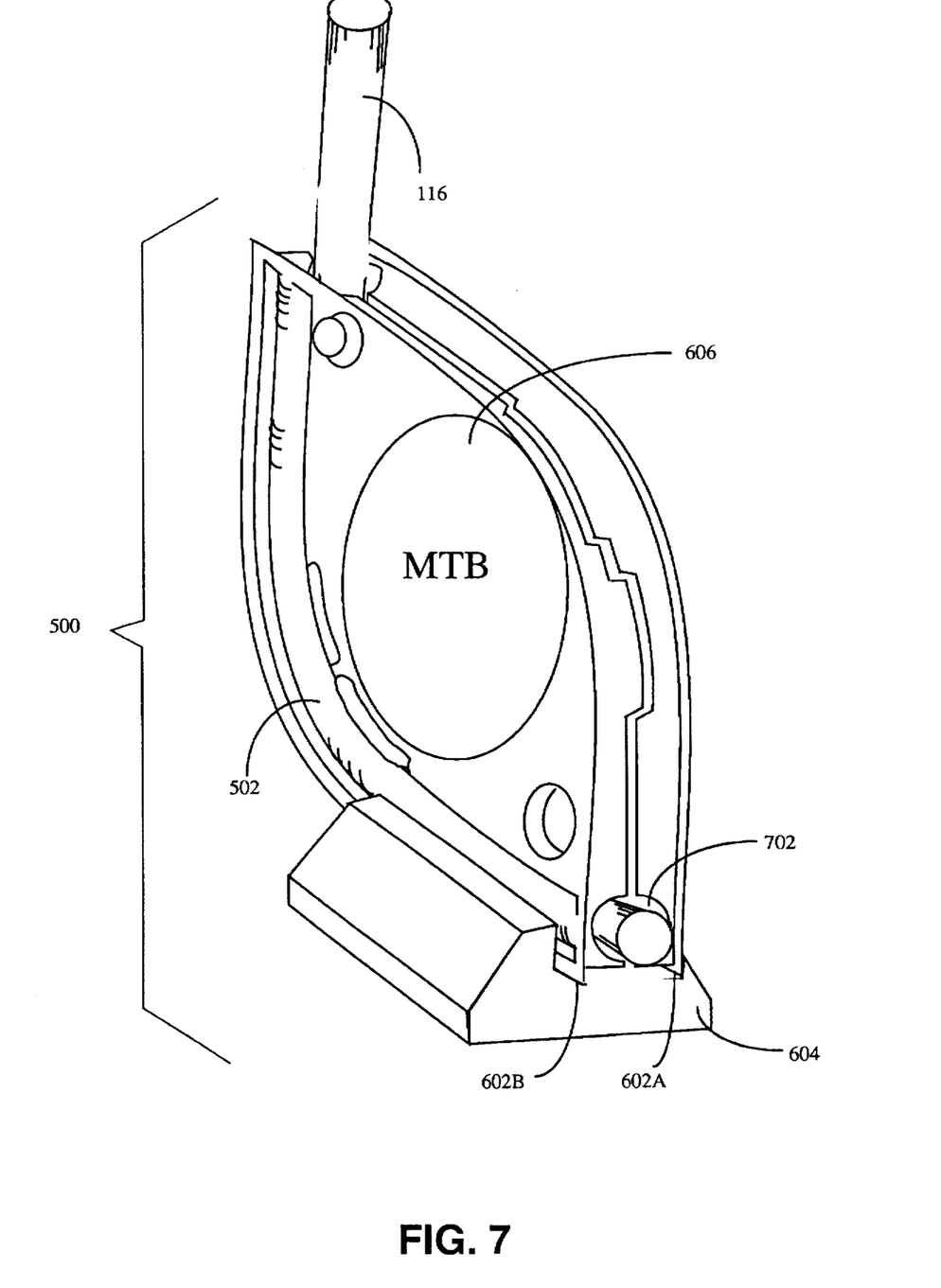
FIG. 7 illustrates an assembled front view of the components of FIG. 5.

Assembly of the cable bender 500 is as follows. The mouse cable 116 is first inserted into the bent channel 614 of the inner-surface of the first cable bender half 602. The bent channel 614 of the second cable bender half 602 is placed over the exposed portion of the mouse cable 116. The keyhole 618 and key 616 of the second cable bender half 602 are respectively aligned with the key 616 and keyhole 618 of the first half. The second cable bender half is squeezed and coupled together with the first half thereby sandwiching the cable 116 in the bent channel 614 of each respective cable bender half 602. The bent channel 614 of each respective cable bender half 602 being sandwiched together generates a bent tube 702 which is preferably has a circular cross section but may assume other shapes. In the case of metallic components, the bent tube may be a metallic tube or open metallic channel. Next the two coupled cable bender halves 602 sandwiching the cable 116 have their respective bottom edges inserted into the slit 622 in the cable bender base 604 as illustrated by the assembled cable bender 500 in FIG. 7. The mouse cable 116 being sandwiched by the cable bender 500 in the bent tube 702 generates the bend 502 in the mouse cable 116 and the tube 702 holds a portion of the cable 116 wrapped about the two cable bender halves 602.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A computer cable bender for supporting above a surface and generating slack in an insulated cable coupling a computer device to a computer system, comprising:

a first bending half, having a perimeter consisting of two arcuate sides, having a first key, a first keyhole, and a first channel bending from a first plane towards a second plane for bending the insulated cable in an arc in a plane above said surface;

a second bending half having a perimeter consisting of two arcuate coupled to the first bending half having a second key coupled to said first keyhole, a second keyhole coupled to said first key, and a second channel opposing said first channel bending in parallel with said first channel from said first plane towards said second plane for bending the insulated cable in said arc; and a base coupled at a bottom of the first bending half and the second bending half for supporting the first and second bending halves above the surface and thereby supporting above the surface and generating slack in the insulated cable coupling the computer device to the computer system.

2. The computer cable bender of claim 1 wherein said first keyhole and said second keyhole are cylindrical keyholes and said first key and said second key are cylindrical keys.

3. The computer cable bender of claim 1 wherein said first plane is horizontal to said surface and said second plane is vertical to said surface.

4. The computer cable bender of claim 1 wherein the first bending half and the second bending half are made of a clear material and further comprises a circular display sandwiched between inner-surfaces of the first bending half and the second bending half for providing information.

5. The computer cable bender of claim 4 further comprising a first arc ridge of a circle and a second arc ridge on an opposing side of said circle disposed on said inner-surfaces of the first bending half and the second bending half for supporting the circular display.

6. The computer cable bender of claim 1 further comprising a first circular display coupled to an outer-surface of the first bending half for providing a first message and a second circular display coupled to an outer-surface of the second bending half for providing a second message.

7. The computer cable bender of claim 6 further comprising a first arc ridge of a circle and a second arc ridge on an opposing side of said circle disposed on outer-surfaces of the first bending half and the second bending half for respectively supporting the first and second circular displays.

8. A method for directing and supporting above a surface an insulated computer mouse cable connecting a computer mouse to a computer slack therein, comprising the steps of:

inserting a portion of the insulated computer mouse cable into a first arcuate channel of a first bending half, having a perimeter consisting of two arcuate sides, having a first key, a first keyhole, and said first channel bending from a first plane towards a second plane for bending the insulated computer mouse cable in an arc in a plane above said surface;

aligning a second arcuate channel of a second bending half, having a perimeter consisting of two arcuate side, with said first channel of the first bending half, a second key of the second bending half with said first keyhole of the first bending half, and a second keyhole of the second bending half with said first key of the first bending half;

coupling the second bending half with the first bending half; and inserting the coupled first and second bending halves into a slit in a base to support the first and second bending halves above the surface whereby slack is generated in the insulated computer mouse cable.

9. The method of claim 8 further comprising the step of coupling a circular display to an inner-surface of either the first bending half or the second bending half for displaying a message.

10. The method of claim 8 wherein said first plane is horizontal to said surface and said second plane is vertical to said surface.

11. A computer cable bender for supporting above a surface and generating slack in an insulated cable coupling a computer mouse to a computer system, comprising:

a first bending half, having a perimeter consisting of two arcuate sides, having a first key, a first keyhole, and a first channel bending from a first plane towards a second plane for bending the insulated cable;

a second bending half, having a perimeter consisting of two arcuate side, coupled to the first bending half having a second key coupled to said first keyhole, a second keyhole coupled to said first key, and a second channel opposing said first channel bending in parallel with said first channel from said first plane towards said second plane for bending the insulated cable; and a base coupled at a bottom of the first bending half and the second bending half for supporting the first and second bending halves above the surface and thereby supporting above the surface and generating slack in the insulated cable coupling the computer mouse to the computer system.

* * * * *